R. D. WELLS.
FLOWERPOT OR OTHER VESSEL.
APPLICATION FILED AUG. 21, 1920.

1,391,353. Patented Sept. 20, 1921.

ON LINE 5-5. FIG. 3.

ON LINE 6-6. FIG. 2.

Russell D. Wells, INVENTOR

BY Niedersheim Fairbanks
ATTORNEYS

UNITED STATES PATENT OFFICE.

RUSSELL D. WELLS, OF ROYERSFORD, PENNSYLVANIA.

FLOWERPOT OR OTHER VESSEL.

1,391,353.   Specification of Letters Patent.   Patented Sept. 20, 1921.

Application filed August 21, 1920. Serial No. 405,170.

*To all whom it may concern:*

Be it known that I, RUSSELL D. WELLS, a citizen of the United States, residing at Royersford, county of Montgomery, State of Pennsylvania, have invented a new and useful Flowerpot or other Vessel, of which the following is a specification.

My invention consists of a novel construction of a flower pot or similar vessel, a saucer therefor and a novel construction of locking means common to said saucer and the bottom of the pot, whereby when the parts are assembled and given a slight axial rotation, the saucer will be firmly and effectively locked with respect to the base of the flower pot, and, in addition, suitable provision will be made for the circulation of water from said flower pot to said saucer.

It further consists of a novel construction of a flower pot having ports through the base thereof and on the bottom of said base parallel radial or diametric ridges or walls forming radial passages communicating with said ports to permit of the circulation of water.

It further consists of a novel construction of a flower pot, having in its base an aperture of cylindrical contour terminating in a slot, above which is located an annular cam surface, whereby the locking of the saucer lug is effected when the parts are assembled, and axially rotated to the desired extent.

It further consists of a novel construction of a saucer having on the base thereof a head provided with a laterally extending locking lug adapted to coact with an opening of a similar contour in the base of the flower pot.

It further consists of other novel features of construction all as will be hereinafter fully set forth.

For the purpose of illustrating my invention, I have shown in the accompanying drawings, a typical embodiment of it which is at present preferred by me, since same will give in practice satisfactory and reliable results, although it is to be understood that the various instrumentalities of which my invention consists can be variously arranged and organized and that my invention is not limited to the precise arrangement and organization of these instrumentalities as herein shown and described.

Similar numerals of reference indicate corresponding parts in the figures.

Referring to the drawings:—

Figure 5:
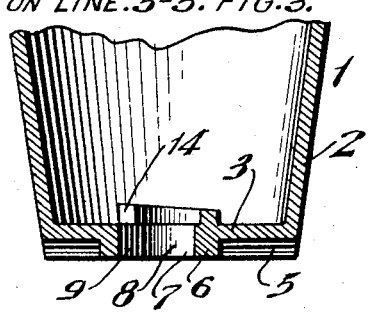
Fig. 5 represents a section on line 5—5 Fig. 3.
Figure 3:
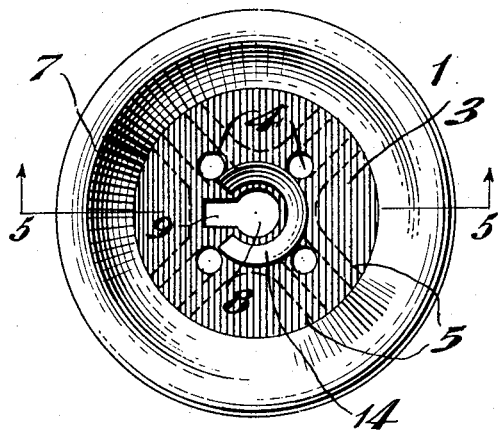
Fig. 3 represents a plan view of Fig. 1.
Figure 6:
Fig. 6 represents a section on line 6—6 Fig. 2.

1 designates the body of my novel construction of flower pot or other vessel which may be made or cast of any suitable material and has the conical or other shaped annular wall 2 and the base 3 having the ports 4 therethrough, which are preferably four in number and extend through the space between the parallel bottom spacing walls or ridges 5, which merge into or are of the same height as the central annular bottom wall 6, which surrounds the aperture 7 which is in the form of a key hole opening 7, having the cylindrical portion 8, and the lateral slot 9, which parts are of the same contour as the locking lug 10 and annular head 11, which is supported or cast on the central boss 12 of the saucer 13, which may be made or cast of any suitable material. 14 designates a raised annular cam surface on the top of the base 3, which partially surrounds the aperture 7, the extent of said cam surface 14 being understood from Fig. 3, and its height or inclination from Fig. 5.

Figure 1:
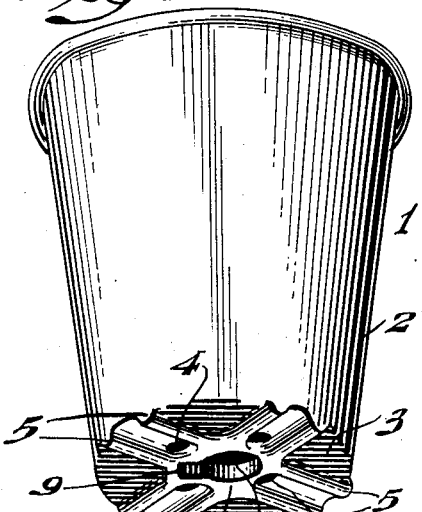
Figure 1 represents a perspective view of a flower pot or other vessel embodying my invention, showing the preferred construction of the under surface of the bottom or base thereof.
Figure 4:
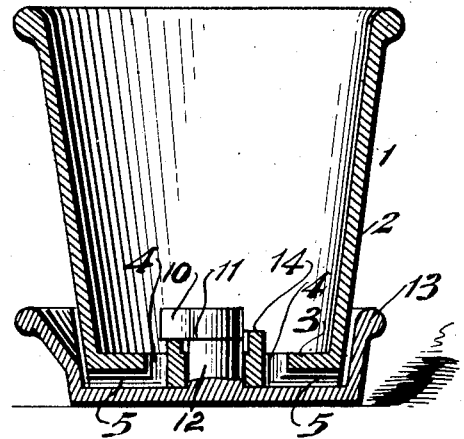
Fig. 4 represents a vertical view of the flower pot and saucer in locked or assembled position.
Figure 2:
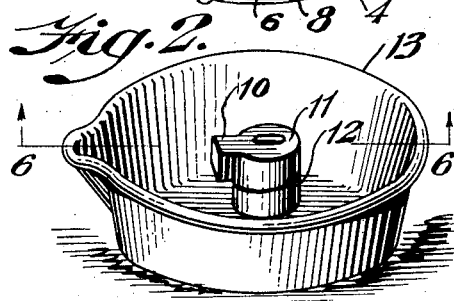
Fig. 2 represents a perspective view of the saucer of the flower pot in disconnected position.

The position the parts may assume when unlocked or prior to assembling, will be understood from Figs. 1 and 2, and to assemble the saucer with respect to the pot or other vessel, it is only necessary to insert the parts 10 and 11, into the corresponding apertures 9 and 8 and then slightly axially rotate the saucer or pot relative to each other, whereupon the bottom of the lug 10, will ride upon the top of the cam surface 14 to the desired extent, so that the saucer and pot will be firmly locked together and appear as seen in Fig. 4. The parts are unlocked, by rotating them axially in the opposite direction to that described until the lug 10 alines with the slot 9, whereupon they can be readily disengaged and appear as seen in Figs. 1 and 2. When the parts are in their locked or assembled position, as seen in Fig. 4 it will be apparent that the bottom of the base 3 is spaced from the top of the saucer 13 by a distance equal to the height of the parallel radial or diametric ridges 5, so that water can circulate through the ports 4, into the saucer 13.

Water circulating passages are formed between the walls or ridges 5, the preferred arrangements of which will be understood from Figs. 1 and 3, wherein said walls are shown as extending radially or diametrically with respect to each other. The extent and inclination of the annular raised cam surface 14 will be clearly understood from Figs. 3 and 5, the terminals of said cam surface being located on each side of the slot 9, and it will further be understood that the lug 10 and head 11 may be cast or made integral with the boss 12, if so desired.

It will be understood that my invention in its broad aspects is applicable to other devices than flower pots or similar vessels and by the term "flower pots" I do not desire to be necessarily limited to a pot or vessel adapted for holding flowers, but to any suitable receptacle or vessel wherein it is desired to have the saucer capable of being readily disengaged therefrom for any purpose.

I have devised a novel and useful construction of a flower pot or vessel, which embodies the features of advantage enumerated as desirable in the statement of the invention and the above description, and while I have, in the present instance shown and described preferred embodiments thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a device of the character stated, a vessel having an aperture in its bottom of annular contour and provided with a laterally extending slot, and an annular raised cam surface above said aperture and in proximity thereto.

2. A flower pot or other vessel having a base provided with ports and parallel walls on the bottom of said base, into the spaces between which walls said ports discharge.

3. In a device of the character stated, a flower pot or other vessel having a key-hole slot in the bottom thereof, an annular raised locking cam surface in proximity to said keyhole slot, and radially extending walls on the bottom of said flower pot, whereby water circulating passages are formed between said walls, said bottom having ports extending therethrough and communicating with said passages between said walls.

4. The combination of a vessel; a saucer therefor, spacing devices intermediate the bottom of said vessel and saucer, an annular raised cam surface on the bottom of said vessel and locking means common to said saucer and vessel, whereby a partial axial rotation of either will immovably lock said saucer with respect to its vessel.

5. The combination of a vessel, a saucer therefor, spacing devices intermediate the bottoms of said vessel and saucer, and locking means common to said saucer and vessel, whereby a partial axial rotation of either will immovably lock said saucer with respect to its vessel, the bottom of said vessel having ports therein leading to the passages between said spacing devices.

RUSSELL D. WELLS.

Witnesses:
PAUL BROOKE,
GEORGE W. WAGONER.